Figure 1:
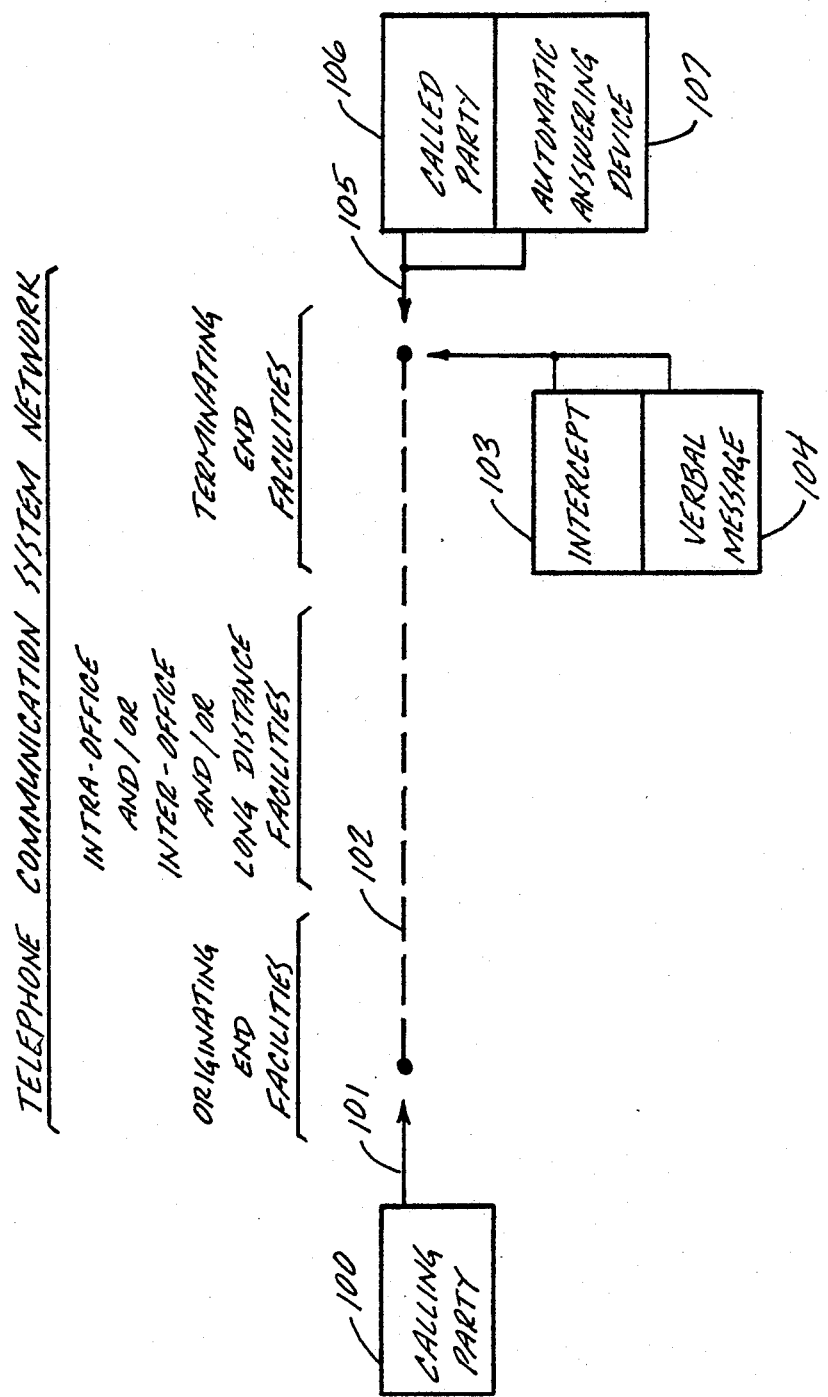

United States Patent [19]

Blom

[11] Patent Number: 4,910,762
[45] Date of Patent: Mar. 20, 1990

[54] FOREWARNING OF TELEPHONE AUTOMATIC ANSWERING DEVICE

[76] Inventor: Frederick A. Blom, 223 Treherne Rd., Timonium, Md. 21093

[21] Appl. No.: 221,878

[22] Filed: Jul. 20, 1988

[51] Int. Cl.[4] .............................................. H04M 3/50
[52] U.S. Cl. ........................................ 379/67; 379/84; 379/213
[58] Field of Search ...................... 379/67, 84, 79, 213, 379/214, 88

[56] References Cited

U.S. PATENT DOCUMENTS 2,691,063 10/1954 Michelini ............................ 379/142

FOREIGN PATENT DOCUMENTS

| 1266818 | 4/1968 | Fed. Rep. of Germany | 379/84 |
| 3027176 | 2/1982 | Fed. Rep. of Germany | 379/67 |
| 0130251 | 7/1985 | Japan | 379/67 |
| 0204155 | 10/1985 | Japan | 379/79 |
| 0040856 | 2/1987 | Japan | 379/213 |

Primary Examiner—Thomas W. Brown

[57] ABSTRACT

A method for a telephone network service that utilizes state of the art intercept and message techniques to verbally advise/forewarn a calling party who is calling a line enabled for this service that the line being called will be answered by an automatic answering device, and offer the calling party the option to terminate the call before the called line answers and, if applicable, before billing for the call is initiated.

4 Claims, 1 Drawing Sheet

FOREWARNING OF TELEPHONE AUTOMATIC ANSWERING DEVICE

BACKGROUND

1. Field of the Invention

This invention relates to telephone communication systems, and particularly to optional telephone network services.

The terminology "automatic answering device" as used in this patent application is intended to mean any telephone recording system, machine, circuitry, device, or service which will answer a telephone call for the end user(s) or subscriber(s) to whom the telephone line is registered or otherwise assigned to be used by.

2. Description of Prior Art

At the present time, a calling party may be connected to and billed for a telephone call to a line that is answered by an automatic answering device. Having the called line answered by an automatic answering device may surprise the calling party. The calling party may be adverse to responding to an automatic answering device. This also may be a call made at long distance rates and entail substantial cost for an unsatisfactory communication attempt.

Most calling parties do not anticipate that the line they are calling will be answered by an automatic answering device, and when in fact the called line is answered by an automatic answering device, they are caught by surprise.

Some calling parties know there is a possibility of an automatic answering device being enabled on the line they are calling, but must wait for the called line to answer to find out for sure.

OBJECTS AND ADVANTAGES

The object of this invention is a method for a service that can be provided to a telephone subscriber who desires to advise/forewarn incoming calls to his line that his line is enabled to be answered by an automatic answering device.

This service will:

(a) Intercept a calling party's line prior to completion to a called line enabled for this service;

(b) Verbally advise/forewarn the calling party that the called line will be answered by an automatic answering device, and offer the calling party the option and opportunity to terminate the call (hang up) before the called line answers and, if applicable, before billing is initiated.

Advantages for a subscriber to this service include:

(a) Fewer unsatisfactory responses to the automatic answering device enabled on his line;

(b) Potential callers will not be adverse to attempting to all him for fear of instead ending up getting connected to his automatic answering device;

(c) Good-will generated to his callers receiving the advantages of this service when attempting to access his line.

p Some advantages to a calling party recipient of the service of this invention who exercises his option to terminate the call, are that he now may:

(a) Take the time to collect his thoughts for a response to the automatic answering device, and then all back confident of a satisfactory communication;

(b) Not be adverse to making additional attempts to the called line until perhaps the automatic answering device will not be enabled on the line, and he will be able to complete his call to the called line party without being intercepted.

A calling party recipient of the service of this invention who does not elect to terminate the call still has the advantage of being forewarned, and gains a few moments to gather his thoughts for a meaningful response to the automatic answering device.

All calling parties to a called line enabled for this service will have the advantage of not being surprised by the called line being answered by an automatic answering device.

Advantages to both local telephone companies and long distance facility companies will be the realization of an increased calling rate due to customers not hesitating to place calls for fear of being surprised by an automatic answering device answering the called line. Also, for those calls reattempted until they complete without an intercept, the talking period will likely be significantly longer than had the calling party completed his call to the called line automatic answering device, and thus more revenue will be generated for the companies.

The local telephone company or provider of optional telephone network services will have the additional advantage of revenue received from the sale of the service of this invention to telephone subscribers desiring to forewarn incoming calls to their line that their line is enabled to be answered by an automatic answering device.

Further objects and advantages of my invention will become apparent to the reader from consideration of the ensuring description and accompanying drawing.

DRAWING

A block diagram, reference as FIG. 1, is provided to typify a telephone call subjected to an intercept which will advise the calling party regarding an automatic answering device enabled on the called party's line.

DESCRIPTION REFERRING TO FIG. 1

The method for the optional telephone network service of this invention is functional during the course of calling party's line "call completing" process to a called line enabled for this service. At this time, and utilizing state of the art telephone intercept and message techniques:

(a) The calling party 100 line connection 101/102 is intercepted 103 after being identified as intending to complete to a called party's 106 line 105 enabled for this service, and completion of the call is temporarily delayed;

(b) A verbal message 104 is then given to the calling party 100 advising that the line being called 105 will be answered by an automatic answering device 107;

(c) The verbal message 104 may also advise the calling party 100 of the option to terminate the call (hang up/go on hook) at this time or before the called line 105 automatic answering device 107 answers;

(d) Following an appropriate delay period, the calling party 100 line connection 101/102 is released from the intercept 103 and, if still "off hook", is allowed to complete the call in a normal manner.

Typically, but not limited to, the calling party 100 may be alerted to the intercept 103 via a tone(s), followed by a verbal message 104, also typically, but not limited to, such as "The number you are calling will be answered by an automatic answering device. You may hang up at this time if you do not desire to complete this call."

OPERATION

A calling party's call to a called line which is enabled with an automatic answering device and also the service of this invention, will be subjected to an intercept of his (the calling party) line. A temporary delay of the call completing process will ensue, during which time the calling party will be verbally advised of the automatic answering device enabled on the called line, and the calling party may be further advised of the option and given the opportunity to terminate the call before the called line answers and, if applicable, before billing is initiated. Following the delay for the intercept and the verbal message, the calling party line is released from the intercept and, if still "off hook", the call completing process to the called line will resume in a normal manner.

Enabling of the service may be accomplished in a variety of ways. For instance, some telephone company facilitates may have the capability to permit enabling of the service via subset dial or touchtone programming by the end user/subscriber; Others may require the end user/subscriber to make personal contact with the telephone company personnel to enable the service. The means of enabling the service will be determined by, and need only be consistent with, the facilities and abilities of the telephone company and the end user/subscriber.

Depending on the degree of sophistication of the telephone company facilities, the extent of the service could be restricted if desired, for instance, by discriminating between local and long distance calls and/or the day or time of a call.

I claim:

1. A method for a telephone network service that can be provided to a telephone subscriber who desires to advise/forewarn incoming calls to his line that his line is enabled to be answered by an automatic answering device comprising:

identifying a calling party's line intending to complete to said line enabled for this service, intercepting said calling party's line, whereby a temporary delay of the call completing process is effected, transmitting a verbal message to said calling party, advising that the line being called is enabled to be answered by an automatic answering device, and subsequently releasing said calling party's line from said intercept.

2. The method of claim 1 wherein said calling party is also advised of the option, and allowed the opportunity, to terminate the call before the called line answers.

3. The method of claim 2 wherein said calling party is also advised of the option, and allowed the opportunity, to terminate the call in time to avoid being billed for a completed call.

4. The method of claim 1 wherein said calling party is also advised of the option, and allowed the opportunity, to terminate the call in time to avoid being billed for a completed call.

* * * * *

UNITED STATES PATENT AND TRADEMARK OFFICE
CERTIFICATE OF CORRECTION

PATENT NO. : 4,910,762

DATED : March 20, 1990

INVENTOR(S) : Frederick A. Blom

It is certified that error appears in the above-identified patent and that said Letters Patent is hereby corrected as shown below:

Column 1, line 55, delete "all"; substitute to --call--.

Column 1, line 60, delete "p" prior to first word on line.

Column 1, line 64, delete "all"; substitute to --call--.

Column 2, line 32, delete "ensuring"; substitute to --ensuing--.

Signed and Sealed this

Ninth Day of April, 1991

*Attest:*

HARRY F. MANBECK, JR.

*Attesting Officer*  *Commissioner of Patents and Trademarks*